(12) United States Patent
Josef et al.

(10) Patent No.: US 7,828,871 B2
(45) Date of Patent: Nov. 9, 2010

(54) SOLUBLE FERTILIZER COMPOSITIONS COMPRISING CALCIUM AND/OR MAGNESIUM PHOSPHATES

(75) Inventors: Alexander Josef, Arad (IL); Shula Tubov, Arad (IL); Itshak Zukerman, Arad (IL)

(73) Assignee: Rotem Amfert Negev Ltd., M.P. Arava (IL)

( * ) Notice: Subject to any disclaimer, the term of this patent is extended or adjusted under 35 U.S.C. 154(b) by 1165 days.

(21) Appl. No.: 10/541,787

(22) PCT Filed: Jan. 15, 2004

(86) PCT No.: PCT/IL2004/000041

§ 371 (c)(1),
(2), (4) Date: Jul. 1, 2006

(87) PCT Pub. No.: WO2004/063126

PCT Pub. Date: Jul. 29, 2004

(65) Prior Publication Data

US 2006/0243012 A1    Nov. 2, 2006

(30) Foreign Application Priority Data

Jan. 16, 2003 (IL) .................................. 154007

(51) Int. Cl.
| | |
|---|---|
| C05B 7/00 | (2006.01) |
| C05B 21/00 | (2006.01) |
| C01B 25/28 | (2006.01) |
| C01B 25/30 | (2006.01) |
| C01B 25/32 | (2006.01) |
| C01B 25/34 | (2006.01) |

(52) U.S. Cl. .................. 71/36; 71/33; 71/41; 71/51; 423/308; 423/309

(58) Field of Classification Search ............... 71/32, 71/33, 34, 36, 41, 51; 423/308, 309
See application file for complete search history.

(56) References Cited

U.S. PATENT DOCUMENTS

| | | | | | |
|---|---|---|---|---|---|
| 1,953,419 | A | * | 4/1934 | MacIntire | 71/43 |
| 5,653,782 | A | * | 8/1997 | Stern et al. | 71/53 |
| 5,865,870 | A | * | 2/1999 | Hsu | 71/32 |
| 5,997,602 | A | * | 12/1999 | Aijala | 71/28 |
| 6,045,810 | A | * | 4/2000 | Moore | 424/400 |
| 6,312,493 | B1 | * | 11/2001 | Eltink et al. | 71/28 |
| 6,749,660 | B2 | * | 6/2004 | Hince | 71/31 |
| 2004/0236052 | A1 | * | 11/2004 | Sanders et al. | 526/325 |

FOREIGN PATENT DOCUMENTS

| | | |
|---|---|---|
| DE | 19 22 968 | 11/1970 |
| DE | 19 24 284 | 11/1970 |
| DE | 19 25 180 | 11/1970 |
| WO | WO 01/05913 | * 1/2001 |

OTHER PUBLICATIONS

ISR from the corresponding application under PCT, PCT/IL2004/000041.
International Search Report for corresponding PCT application—2 pages.
International Preliminary Report for corresponding PCT application for this application—5 pages.

* cited by examiner

*Primary Examiner*—Wayne Langel
(74) *Attorney, Agent, or Firm*—Roach Brown McCarthy & Gruber, P.C.; Kevin D. McCarthy

(57) ABSTRACT

The present invention provides fertilizer compositions comprising calcium and magnesium phosphates together with alkali metal double phosphates, and process for their preparation. The solid composition is freely flowing and well soluble.

14 Claims, No Drawings

SOLUBLE FERTILIZER COMPOSITIONS COMPRISING CALCIUM AND/OR MAGNESIUM PHOSPHATES

FIELD OF THE INVENTION

The present invention relates to solid, highly soluble fertilizer compositions, comprising Monobasic Calcium Phosphate (MCP) and/or Monobasic Magnesium Phosphate (MMgP), together with alkali metal double phosphates, which compositions are solid, freely flowing and highly soluble, and to a method for preparing said compositions.

BACKGROUND OF THE INVENTION

Monobasic Calcium Phosphate (MCP) $Ca(H_2PO_4)_2$ and Monobasic Magnesium Phosphate (MMgP) $Mg(H_2PO_4)_2$ are widely used as fertilizers. They have the drawback of being only slightly soluble in water, whereas such fertilizers are usually applied in aqueous solutions. However, solubility, while essential, is not the only property required. Fertilizers must be packed, shipped and handled, and therefore must have appropriate physical properties, viz. must be adapted to form granules or powders that are free flowing, have low hygroscopicity, do not tend to agglomerate, and so forth. The art does not provide such fertilizers or their formulations having such optimal physical characteristics, in addition to high solubility.

It is therefore the purpose of this invention to provide compositions, comprising MCP and/or MMgP, that have such desirable physical properties.

It is another purpose of this invention to provide such compositions that are suitable for use as components of food and/or drinks.

It is a further purpose to obtain such compositions in crystalline and homogeneous form.

It is a further purpose to obtain such compositions which contain other fertilizer compounds, preferably potassium compounds.

It is a further purpose to provide formulations from which such compositions are obtained and a process for obtaining said compositions from said formulations.

SUMMARY OF THE INVENTION

The present invention, in one of its aspects, provides fertilizers formulations comprising the following components: 1) at least one monobasic earth-alkali metal phosphate, chosen from among Calcium Phosphate (MCP) $Ca(H_2PO_4)_2$, Magnesium Phosphate (MMgP) $Mg(H_2PO_4)_2$, or mixtures thereof; 2) at least one alkali metal phosphate; and 3) Phosphoric Acid (PA) $H_3PO_4$. The alkali metal phosphate will be generally indicated hereinafter by MALP, and is preferably Monopotassium Phosphate (MKP) $KH_2PO_4$. The term "alkali metal", as used herein, should be construed as including $NH_4$.

The said formulations, as such, are an object of the invention. However, also according to the invention, they are subjected to a homogenizing, drying and heating processing, from which are obtained fertilizer compositions that can be stored, shipped and used for making aqueous solutions, said solution being applied to the areas to be fertilized. During the processing the alkali metal phosphate MALP reacts with PA to form a double salt, that will be indicated as $AH_5(PO_4)_2$ or, shortly, HAP, and is $KH_5(PO_4)_2$ if the alkali metal is potassium. In order to distinguish from the original mixture, which contains an alkali metal phosphate MALP and $H_3PO_4$, and the processed material, which contains the double salt HAP and, optionally, an amount of MALP, the original mixture will be called hereinafter "fertilizer formulation" and the processed material will be called hereinafter "fertilizer composition".

The required amounts of the above components in the formulations are given hereinafter. Said amounts must satisfy the following conditions:
a) MALP (preferably MKP) is in a molar ratio to PA that is at least the ratio corresponding to the alkali metal double salt $AH_5(PO_4)$ (HAP). However, there may be a moderate excess of MALP over said ratio, viz. the ratio $A_2O:P_2O_5$ (preferably $K_2O:P_2O_5$), wherein the $P_2O_5$ does not comprise that included in phosphate moieties of the earth-alkali metal phosphates, must be from about 0.5 to about 0.8. Small departures from said limits may also be acceptable.
b) The molar ratio of CaO and/or MgO to $P_2O_5T$, wherein $P_2O_5T$ comprises the total amount of $P_2O_5$ included in the formulations, is: A) from 1:4.5 to 1:15.1, typically 1:4.8, if the earth-alkali metal is calcium; B) from 1:3.3 to 1:7.5, typically 1:3.8, if the earth-alkali metal is magnesium.

The compositions, after processing, comprise therefore MCP or MMgP and HAP, and may comprise an amount of MALP. The molar ratios of said components depend on the molar ratios of the formulations from which they derive. The molar ratio of CaO and/or MgO to $P_2O_5$ is the same as in the corresponding formulation. The molar ratio of MALP to HAP is from zero to 60%. Small departures from said limits may also be acceptable. Of course, additional components may be present to supply additional fertilizer moieties or for other purposes known in the fertilizer art.

Another aspect of the invention is a process for the preparation of the compositions of the invention from the corresponding formulations. Said process comprises the steps of preparing the formulation, preferably in the form of a watery paste; introducing said formulation into an drying oven of a material resistant to said components (particularly to the PA); and mechanically homogenizing the mixture, while concurrently drying it by heating under a vacuum.

If it is intended to use the product in food or drink, all the components must be of a quality certified for such a use.

The compositions can be dissolved in water at room temperature or above it, and form clear solutions. Their solubility varies from 10 to 40% by weight, the higher solubilities being attained when the earth-alkali metal is magnesium. Solutions of 1 wt % of the above compositions have pH 2÷2.5.

The properties of the compositions in their solid, dry state are as follows: grain size of their granulates or powders 0.05<diameter<1.0 mm; bulk density of the 0.5÷1.2; hygroscopicity 50÷70% C.R.H. (critical relative humidity); free flowability index, determined as described below, 40-70%.

The free flowing index is determined as follows. A funnel of stainless steel is used, having a smooth surface, a top diameter of 100 mm and a bottom diameter of 10 mm. 300 grams of the substance under examination are introduced into said funnel while keeping its bottom opening closed. Then the bottom opening is opened, the substance is allowed to flow into a receiving container, and the time required for it to flow completely through the funnel is measured. The same measurement is carried out for a substance used as standard. The flowability index FI % is FI %=$100(t_0/t_1)$, wherein $t_o$ is the flow time measured for the standard substance and $t_1$ is the flow time measured for the substance under examination. In this application, the standard substance is MKP and $t_o$ is 16 seconds. It is clear that the more quickly the substance under examination flows, the higher is its flowability index.

The compositions of the invention are crystalline. X-ray analysis shows two types of crystals: those of earth-alkali metal monophosphates Ca $(H_2PO_4)_2$ and/or $Mg(H_2PO_4)_2$ and crystals of $AH_2PO_4$ and $AH5(PO4)2$, where A is the alkali metal.

The formulations can be ground, sieved and packed, e.g., in bags, for storage, transportation and selling to users, and they give clear aqueous solutions even close to or at saturation concentration.

DETAILED DESCRIPTION OF PREFERRED EXAMPLES

Ranges of optimal concentration ratios are given in Table I.

TABLE I

| Optimal Ranges | | Broad Ranges | | |
| --- | --- | --- | --- | --- |
| CaO(MgO): $A_2O$ | CaO(MgO): $P_2O_5T$ | CaO(MgO): $A_2O$ | CaO(MgO): $P_2O_5T$ | Salt |
| 0.35 ÷ 0.66 | 0.14 ÷ 0.21 | 0.062 ÷ 0.74 | 0.032 ÷ 0.224 | $Ca(H_2PO_4]$ |
| 0.56 ÷ 1.76 | 0.19 ÷ 0.33 | 0.13 ÷ 2.12 | 0.075 ÷ 0.35 | $Mg(H_2PO4]$ | where A is either K, Na or $NH_4$.

where A is either K, Na or $NH_4$.

In the Table $P_2O_5T$ means total phosphoric anhydride, viz. the total amount of the $P_2O_5$ in the composition, comprising that which is part of the earth-alkali phosphates, the alkali phosphates and the phosphoric acid.

The following examples illustrate embodiments of the invention. The percentages are by weight.

Example 1

Into a drying oven, made of stainless steel and with a work volume of 6 liters, and provided with an agitator, the following chemicals were charged:

Phosphoric acid ($P_2O_5$ 67.5%) 3123.8 gr
MKP ($KH_2PO_4$) 1824 gr
Slurry of Magnesium hydroxide ($Mg(OH)_2$ 79.5%) 879.3 gr, and 1219 gr of water (35% solids).

During the charge of those chemicals, the agitator was operated at 50 rpm. Once the charge was completed, heating was begun by means of a heating jacket with circulation of hot oil having a temperature of 120° C. Subsequently a vacuum pump was actuated, gradually to avoid loss of material due to violent boiling since the vacuum may reach 50 mbar. Water was removed during two hours until the water content of the drier content was lowered to 0.36%. A powdery material is thus obtained, which is free-flowing and may be extracted and transferred to a storage vessel. A portion thereof remains in the oven, sticking to the agitator and the walls. The extracted powdery material has the granulometry shown in the following table, in which the first column indicates the weight percentage of the fractions the size range of which is indicated in the second column in millimeters.

| | |
| --- | --- |
| 26.9 | >4 mm |
| 26.0 | 2-4 mm |
| 20.3 | 1-2 mm |
| 14.4 | 0.45-1 mm |
| 4.9 | 0.25-0.45 mm |
| 5.3 | 0.125-0.25 mm |
| 2 | <0.125 mm |

The chemical analysis of the product indicates the following weight percentages:

$P_2O_5$ 59.6%, $K_2O$ 11.3%, MgO 8.8%. Turbidity NTU 4.
The product further contains the following metals:
<10 ppm heavy metals
10 ppm Zn
0.4 ppm Pb
0.46 ppm V
1.3 ppm Mn
13 ppm Fe
1 ppm Cu
0.2 ppm Cd
1.3 ppm As
The pH is 2.4
Flowability Test—64%
Solubility at 20° C.—55%

Example 2

The drying oven used is the same as in Example 1. The materials charged into it are:

Phosphoric acid ($P_2O_5$ 66.9%) 2239 gr
MKP ($KH_2PO_4$) (99.8%) 1330.8 gr
Slurry containing 488 gr of $Ca(OH)_2$ dry, and 905.7 gr of water.

During the charge of those chemicals, the agitator was operated at 50 rpm. Once the charge was completed, heating was begun by means of a heating jacket with circulation of hot oil having a temperature of 120° C. Subsequently a vacuum pump was actuated, gradually to avoid loss of material due to violent boiling since the vacuum may reach 50 mbar. Water was removed during two hours until the water content of the drier content was lowered to 1.5%. A powdery material is thus obtained, which is free-flowing and may be extracted and transferred to a storage vessel. A portion thereof remains in the oven, sticking to the agitator and the walls. The extracted powdery material has the granulometry shown in the following table, in which the first column indicates the weight percentage of the fractions the size range of which is indicated in the second column in millimeters.

| | |
| --- | --- |
| 7.7 | >1 mm |
| 6.8 | 0.425-1 mm |
| 2.1 | 0.25-0.425 mm |
| 2.3 | 0.125-0.25 mm |
| 81.1 | <0.125 mm |

The chemical analysis of the product indicates the following weight percentages: $P_2O_5$% 57.1%, $K_2O$ % 11.4%, CaO 8.5%. Turbidity NTU 18.

Flowability Test—70%. Solubility at 20° C.—41.7%. C.R.H.—70%.

The pH is 2.5.
The product further contains the following metals:
10 ppm heavy metals
36 ppm Zn
0.26 ppm Pb
1.2 ppmV
2 ppm Mn 28 ppm Fe
1.3 ppm Cu
0.2 ppm Cd
0 ppm As Example 3

The drying oven used is the same as in Example 1. The materials charged into it are:
Phosphoric acid ($P_2O_5$ 67.5%) 4733.1 gr,
Sodium hydroxide (NaOH 47.7%) 1363.5 g
Slurry containing 878.75 gr of $Mg(OH)_2$ (79.5%) and 1117 gr of water.

During the charge of those chemicals, the agitator was operated at 50 rpm. Once the charge was completed, heating was begun by means of a heating jacket with circulation of hot oil having a temperature of 120° C. Subsequently a vacuum pump was actuated, gradually to avoid loss of material due to violent boiling since the vacuum may reach 50 mbar. Water was removed during two hours until the water content of the drier content was lowered to 1.1%. A powdery material is thus obtained, which is free-flowing and may be extracted and transferred to a storage vessel. A portion thereof remains in the oven, sticking to the agitator and the walls. The extracted powdery material has the granulometry shown in the following table, in which the first column indicates the weight percentage of the fractions the size range of which is indicated in the second column in millimeters.

| | |
|---|---|
| 13.1 | >1 mm |
| 13.2 | 0.425-1 mm |
| 3.9 | 0.25-0.425 mm |
| 18.7 | 0.125-0.25 mm |
| 51.1 | <0.125 mm |

The chemical analysis of the product indicates the following weight percentages: $P_2O_5$% 60:9%, $Na_2O$ % 9.4%, MgO % 9.1%. Turbidity NTU 4.
The pH is 3.0.
The product further contains the following metals:

| | | |
|---|---|---|
| 10 | ppm | heavy metals |
| 21 | ppm | Zn |
| 0.9 | ppm | V |
| 1.7 | ppm | Mn |
| 22 | ppm | Fe |
| 0.32 | ppm | Pb |
| 0.9 | ppm | Cu |
| 0.2 | ppm | Ca |
| 0 | ppm | As |

Flowability - 42.1%.
Solubility at 20° C. - 51.9%.
C.R.H. - 55%.

The above examples are intended to illustrate the invention and it is to be understood that the invention can be carried out with many modifications, adaptations and variations, without departing from its spirit or exceeding the scope of the claims.

The invention claimed is:

1. Solid, freely flowing, fertilizer formulations comprising:
   I) a monobasic earth-alkali metal phosphate;
   II) an alkali metal phosphate (MALP) $AH_2PO_4$; and
   III) phosphoric acid (PA) $H_3PO_4$,
   wherein said monobasic earth-alkali metal phosphate is selected from the group consisting of calcium phosphate $Ca(H_2PO_4)_2$, magnesium phosphate $Mg(H_2PO_4)_2$, and mixtures thereof;
   wherein A is selected from the group consisting of Na, K and $NH_4$; and
   wherein during the processing of said formulations, said MALP reacts with said PA to form an alkali metal double salt ($AH_5(PO_4)_2$).

2. Fertilizer formulations according to claim 1, wherein said MALP is monopotassium phosphate $KH_2PO_4$.

3. Fertilizer formulations according to claim 1, wherein a) said MALP is in a molar ratio to PA that is at least the ratio corresponding to the double salt $AH_5(PO_4)_2$.

4. Fertilizer formulations according to claim 3, wherein the ratio $A_2O:P_2O_5$, wherein the $P_2O_5$ does not comprise that included in phosphate moieties of the earth-alkali metal phosphates, is from about 0.50 to about 0.80.

5. Fertilizer formulations according to claim 3, wherein the molar ratio CaO and/or MgO to $P_2O_5T$, wherein $P_2O_5T$ comprises the total amount included in the formulations, is from 1:4.5 to 1:15.1 if the earth-alkali metal is calcium, and from 1:3.3 to 1:7.5 if the earth-alkali metal is magnesium.

6. Fertilizer formulations according to claim 5, wherein the molar ratio CaO and/or MgO to $P_2O_5T$, wherein the $P_2O_5T$ comprises the total amount included in the formulations, is about 1:4.8 if the earth-alkali metal is calcium, and about 1:3.8 if the earth-alkali metal is magnesium.

7. Solid, freely flowing, fertilizer compositions comprising:
   a monobasic earth-alkali metal phosphate, and an alkali metal double salt $AH_5(PO_4)_2$, wherein A is selected from the group consisting of K, Na, $NH_4$; and wherein said monobasic earth-alkali metal phosphate is calcium phosphate $Ca(H_2PO_4)_2$, magnesium phosphate $Mg(H_2PO_4)_2$, or mixtures thereof.

8. Fertilizer compositions according to claim 7, further comprising an alkali metal phosphate (MALP) $AH_2PO_4$.

9. Fertilizer compositions according to claim 7, wherein the alkali metal double salt is $KH_5(PO_4)_2$.

10. Fertilizer compositions according to claim 8, wherein said MALP is monopotassium phosphate $KH_2PO_4$.

11. Fertilizer compositions according to claim 7, wherein the molar ratio of CaO and/or MgO to $P_2O_5T$, wherein the $P_2O_5T$ comprises the total amount included in the compositions, is from 1:4.5 to 1:15.1 if the earth-alkali metal is calcium, and from 1:3.3 to 1:7.5 if the earth-alkali metal is magnesium.

12. Fertilizer compositions according to claim 11, wherein the molar ratio CaO and/or MgO to $P_2O_5T$, wherein the $P_2O_5T$ comprises the total amount included in the compositions, is about 1:4.8 if the earth-alkali metal is calcium, and is about 1:3.8 if the earth-alkali metal is magnesium.

13. Fertilizer compositions according to claim 11, wherein the molar ratio of MALP to $AH_5(PO_4)_2$ is from zero to 60%.

14. Process for the preparation of the compositions of claim 7, which comprises the steps of preparing a formulation according to any one of claims 1 to 6; introducing said formulation into a drying oven of a material resistant to the components of said formulation; and mechanically homogenizing said formulation while concurrently drying it by heating under a vacuum.

* * * * *